United States Patent

Kittaka et al.

[11] Patent Number: 5,959,783
[45] Date of Patent: Sep. 28, 1999

[54] ROD LENS ARRAY AND LIFE-SIZE IMAGING OPTICAL APPARATUS USING THE SAME

[75] Inventors: Shigeo Kittaka; Kiyosumi Fujii, both of Osaka, Japan

[73] Assignee: Nippon Sheet Glass Co., Ltd., Osaka, Japan

[21] Appl. No.: 09/095,566

[22] Filed: Jun. 11, 1998

[30] Foreign Application Priority Data

Jun. 24, 1997 [JP] Japan ................................. 9-183124

[51] Int. Cl.⁶ .......................................... G02B 6/18
[52] U.S. Cl. ........................... 359/654; 359/652; 385/124
[58] Field of Search ............................... 359/652, 654, 359/653; 385/124

[56] References Cited

U.S. PATENT DOCUMENTS

| 4,349,248 | 9/1982 | Rees | 359/652 |
| 4,571,022 | 2/1986 | Lama et al. | 359/652 |
| 4,761,062 | 8/1988 | Loce et al. | 359/654 |
| 4,852,982 | 8/1989 | Yamamoto et al. | 359/652 |
| 5,450,157 | 9/1995 | Rees | 359/652 |

*Primary Examiner*—Scott J. Sugarman
*Attorney, Agent, or Firm*—Whitham, Curtis & Whitham

[57] ABSTRACT

In a rod lens array in which a plurality of rod lenses each having a refractive-index distribution in the radial direction are arranged in two rows such that the optical axis for one row is parallel to that for the other row, and in a life-size imaging optical apparatus using the rod lens array, the outside diameter of each rod lens is such that $0.05 \text{ mm} \leq R \leq 0.25$ mm and $0.5R \leq r_0 \leq 1.0R$ (2R: the distance between the optical axes of adjacent rod lenses and $r_0$: the radius of the effective area of each rod lens that provides a lens action) and the degree of overlap m defined by $m = X_0/2R$ is such that $1.46 \leq m \leq 1.64$ (where $X_0$ is the view radius of a single rod lens which is given by $X_0 = -r_0/\cos(Z_0\pi/P)$.

7 Claims, 11 Drawing Sheets

ROD LENS ARRAY AND LIFE-SIZE IMAGING OPTICAL APPARATUS USING THE SAME

BACKGROUND OF THE INVENTION

1. Field of the invention

The present invention relates to a life-size imaging rod lens array comprising a plurality of small-diameter rod lenses arranged in two rows. The invention also relates to a life-size imaging optical apparatus which has the surface of a document and a sensor provided on opposite sides of the rod lens array such that the image on the surface of a document is read and transmitted to the sensor. The technology of the invention is useful when applied to the optics of facsimile and other optical machines.

2. Related Art

Optical machines such as facsimile, copiers, printers and scanners employ various types of scanning apparatus in order to convert the information on the surface of a document to readable electrical signals. A common scanning apparatus is of a "contact" type that comprises illumination optics, a rod lens array as life-size imaging optics, a sensor, a cover glass (transparent substrate) and other parts mounted in a frame. The document is placed in contact with the surface of the cover glass and illuminated with light from the illumination optics. The illuminated image on the document passes through the rod lens array to be focused on the sensor, where it is converted to an electrical signal. The rod lens array is life-size imaging optics in which a plurality of rod lenses each having a refractive-index distribution in the radial direction are arranged, typically in one or two rows.

The lens material of which the rod lens array is made is either glass or plastics. Glass rod lenses with a refractive-index distribution are manufactured by ion-exchange or thermal interdiffusion or a like method. For example, the rod lenses in a commercial glass rod lens array have a minimum outside diameter of 0.6 mm.

A single rod lens forms a life-size image in a range defined by a circle with a radius of $X_0$ (i.e., the view radius) and the quantity of light which is maximal on the optical axis decrease with the increasing radial distance. Therefore, the distribution of the quantity of light along the length of the lens array experiences unevenness at a period which is equal to the distance between adjacent lenses. The magnitude of the unevenness is determined by the degree of overlap m which is defined by $m=X_0/2R$, where $2R$ is the distance between the optical axes of adjacent rod lenses.

Figure 1:
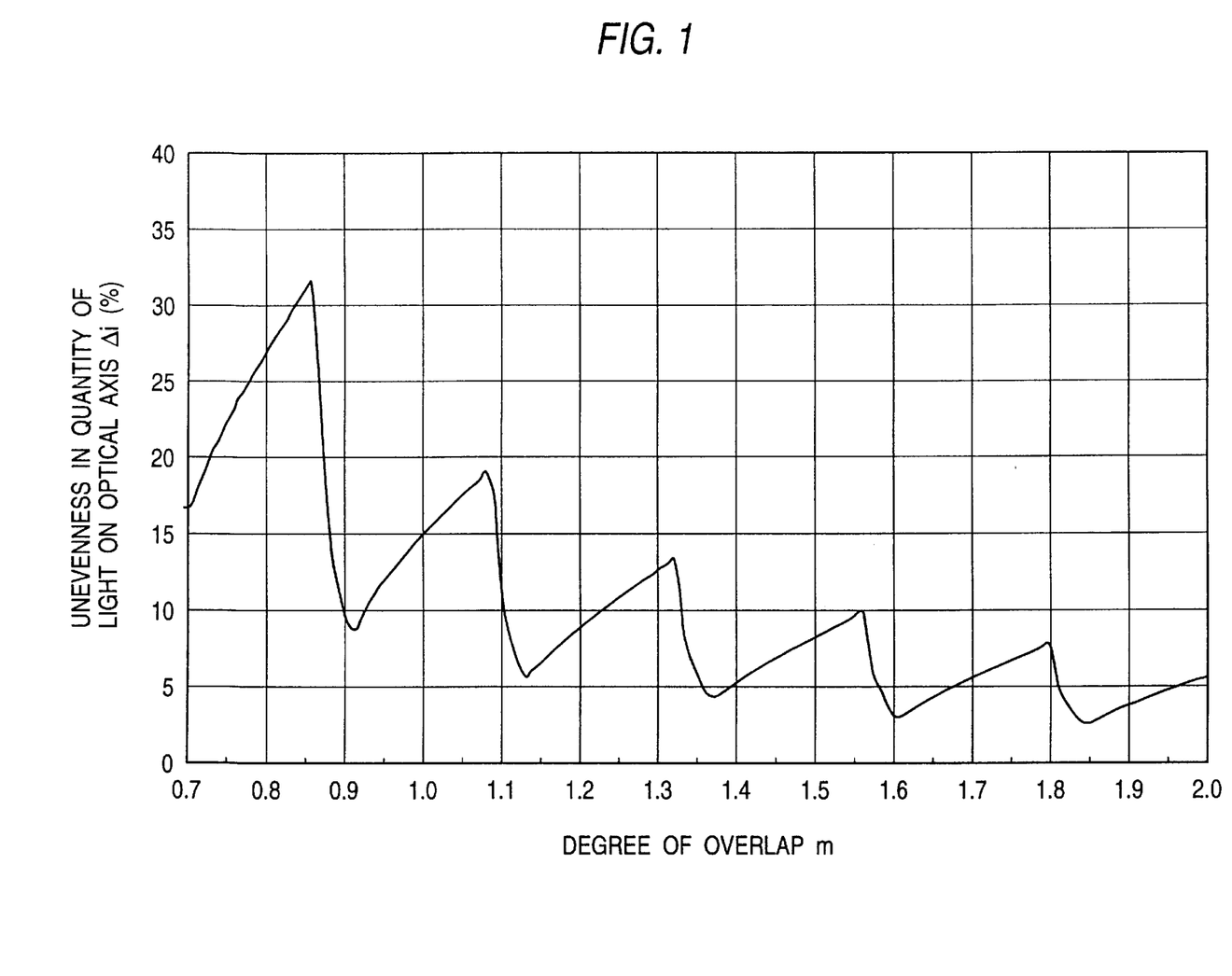
FIG. 1 is a graph showing the relationship between the degree of overlap m and the unevenness in the quantity of light.

FIG. 1 shows how the unevenness in the quantity of light varies as a function of the degree of overlap m in a two-row rod lens array for a so-called "line scanning system" which utilizes light in an extremely narrow range near to the overall optical axis of the lens array. Obviously, the unevenness in the quantity of light tends to decrease with the increasing degree of overlap m; however, the decrease is not monotonic but minima occur at m=0.91, 1.13, 1.37, 1.61, 1.85, . . . The smaller the amount of unevenness in the quantity of light on the sensor, the better its performance; hence, if it is paramount to minimize the unevenness in the quantity of light, the lens array is designed to ensure that the degree of overlap m assumes the above-mentioned values.

The values of unevenness in the quantity of light that are shown in FIG. 1 are those which occur when the sensor is positioned accurately on the overall optical axis of the lens array. However, actual mass-produced scanning apparatus unavoidably suffer from a certain amount of transverse misalignment between the sensor and the overall axis of the lens array on account of dimensional errors in parts and assembling errors.

In the conventional lens array in which each rod lens has an outside diameter of 0.6 mm φ or more, the above-defined transverse misalignment is sufficiently smaller than the view radius $X_0$ that it can be ignored without any problem. However, the idea of reducing the rod lens diameter is recently under review in order to realize a compact scanning apparatus and if rod lenses with a diameter smaller than 0.5 mm φ are employed, the relative amount of transverse misalignment between the sensor and the overall axis of the lens array increases to potentially cause an unevenness in the quantity of light that exceeds the design value.

SUMMARY OF THE INVENTION

An object, therefore, of the present invention is to provide a life-size imaging rod lens array which can be operated to produce a minimal amount of unevenness in the quantity of light even if a transverse misalignment occurs between the sensor and the overall axis of the lens array on account of the dimensional errors in parts and assembling errors resulting from the use of smaller-diameter rod lenses and which therefore contributes not only to the reduction in the size of a life-size imaging optical apparatus but also to the ease in its manufacture.

Another object of the invention is to provide a life-size imaging optical apparatus using said rod lens array.

The first aspect of the present invention is a life-size imaging rod lens array in which a plurality of rod lenses each having a refractive-index distribution in the radial direction are arranged in two rows such that the optical axis for one row is parallel to that for the other row. The rod lens array is adapted to satisfy the following conditions:

(1) the outside diameter of each rod lens is such that $0.05$ mm $\leq R \leq 0.25$ mm and $0.5R \leq r_0 \leq 1.0R$ where $2R$: the distance between the optical axes of adjacent rod lenses;

$r_0$: the radius of the effective area of each rod lens that provides a lens action;

(2) when the refractive-index distribution of each rod lens is approximated by $n(r)^2 = n_0^2 \cdot \{1-(g \cdot r)^2\}$, $0.05 \leq n_0 \cdot g \cdot r_0 \leq 0.50$ and $1.40 \leq n_0 \leq 1.75$ where r: the distance from the optical axis;

n(r): the refractive index at distance r from the optical axis;

$n_0$: the refractive index at the optical axis;

g: the coefficient of the refractive-index distribution;

(3) the length of each rod lens $Z_0$ is such that $0.5 < Z_0/P < 1.0$ where P: the periodic length of each rod lens as defined by $P = 2\pi/g$; and (4) the degree of overlap m defined by $m = X_0/2R$ is such that $1.46 \leq m \leq 1.64$ where $X_0$: the view radius of a single rod lens which is given by $X_0 = -r_0/(\cos(Z_0 \pi/P))$.

Thus, according to the present invention, certain parameters of a rod lens array are specified in such a way that even if a transverse misalignment occurs between the sensor and the overall axis of the lens array due to the dimensional errors in parts and the assembling errors which accompany the adoption of smaller-diameter rod lenses, the unevenness in the quantity of light can be minimized to contribute to the realization of a compact life-size imaging optical apparatus and to greater ease in its manufacture.

The second aspect of the present invention is a life-size imaging optical apparatus which uses a life-size imaging rod lens array in which a plurality of rod lenses each having a refractive-index distribution in the radial direction are arranged in two rows such that the optical axis for one row is parallel to that for the other row, with the surface of a document and a sensor being positioned on opposite sides of said lens array, wherein said rod lens array is as recited in claim 1 and the distance L between the surface of a document and an end face of each proximal rod lens and the distance L between the sensor and an end face of each proximal rod lens, each distance being calculated as that of an air layer, both satisfy the following condition:

$L = L_0$ where $L_0$: the lens working distance given by $L_0 = -(1/n_0 g) \cdot \tan(Z_0 \pi / P)$.

DETAILED DESCRIPTION OF THE PREFERRED EMBODIMENTS

Principle of the present invention

If the rod lenses as the components of the lens array are in contact with one another and if their effective radius $r_0$ is equal to the lens radius, $r_0$ is equal to R. In practice, however, adjacent rod lenses are spaced apart by a certain distance for some reason associated with the process of assembling the lens array or the marginal of each rod lens is sometimes rendered opaque in order to block the pencils of light that will pass through that area where an undesirable index distribution will occur. Under these circumstances, the degree of overlap is defined in terms of R. The transverse misalignment between the sensor and the overall axis of the rod lens array is problematic if the rod lenses have a small diameter ($R \leq 0.5$). In the present invention, R is specified to be at least 0.05 mm and smaller lens diameters are practically infeasible for various reasons such as one associated with manufacturing (e.g. extreme difficulty in handling). Another requirement is that $r_0$ be 0.5R or more but not greater than 1.0R. If $r_0$ is less than 0.5R, the brightness of the image will decrease to an undersirably low level.

The brightness of the rod lens array is expressed by the angle of aperture $\theta_0 = n_0 \cdot g \cdot r_0$ in radius and the greater the value of $\theta_0$, the brighter the image that is produced. For use in a life-size imaging optical apparatus, the rod lens array desirably has a $\theta_0$ of 0.05 or more. On the other hand, a rod lens having a $\theta_0$ in excess of 0.50 is difficult to fabricate by reason of the limits on the contents of index distributing components (e.g. $Tl_2O$ and $Li_2O$ to be used in glass lenses). Under these circumstances, the angle of aperture $\theta_0$ is specified to lie within the range $0.05 \leq n_0 \cdot g \cdot r_0 \leq 0.50$.

The refractive index of each rod lens at the optical axis which is expressed by $n_0$ is preferably as large as possible since the angle of aperture $\theta_0$ increases with $n_0$. For example, in the case of a glass lens, the high contents of monovalent cationic components permit $n_0$ to take actual values within the range $1.40 \leq n_0 \leq 1.75$.

In order to satisfy the condition for the formation of an erecting image, the length of each rod lens $Z_0$ must be such that $0.5 < Z_0/P < 1.0$, where P is the periodic length of each rod lens defined by $P = 2\pi/g$.

The unevenness is the quantity of light that occurs in the presence of transverse misalignment between the sensor and the overall axis of the lens array can be determined by using a mathematical expression for the distribution of the quantity of light within the view radius. As already mentioned, the view radius $X_0$ is given by:

$X_0 = -r_0/\cos(Z_0 \pi / P)$ and the distribution of brightness within the view radius is expressed by:

$E(X) = E_0 \{1 - (X/X_0)^2\}^{1/2}$ where $E_0$: the quantity of light on the optical axis;

X: the distance from the optical axis; and

E(X): the quantity of light at distance X from the optical axis.

Figure 2:
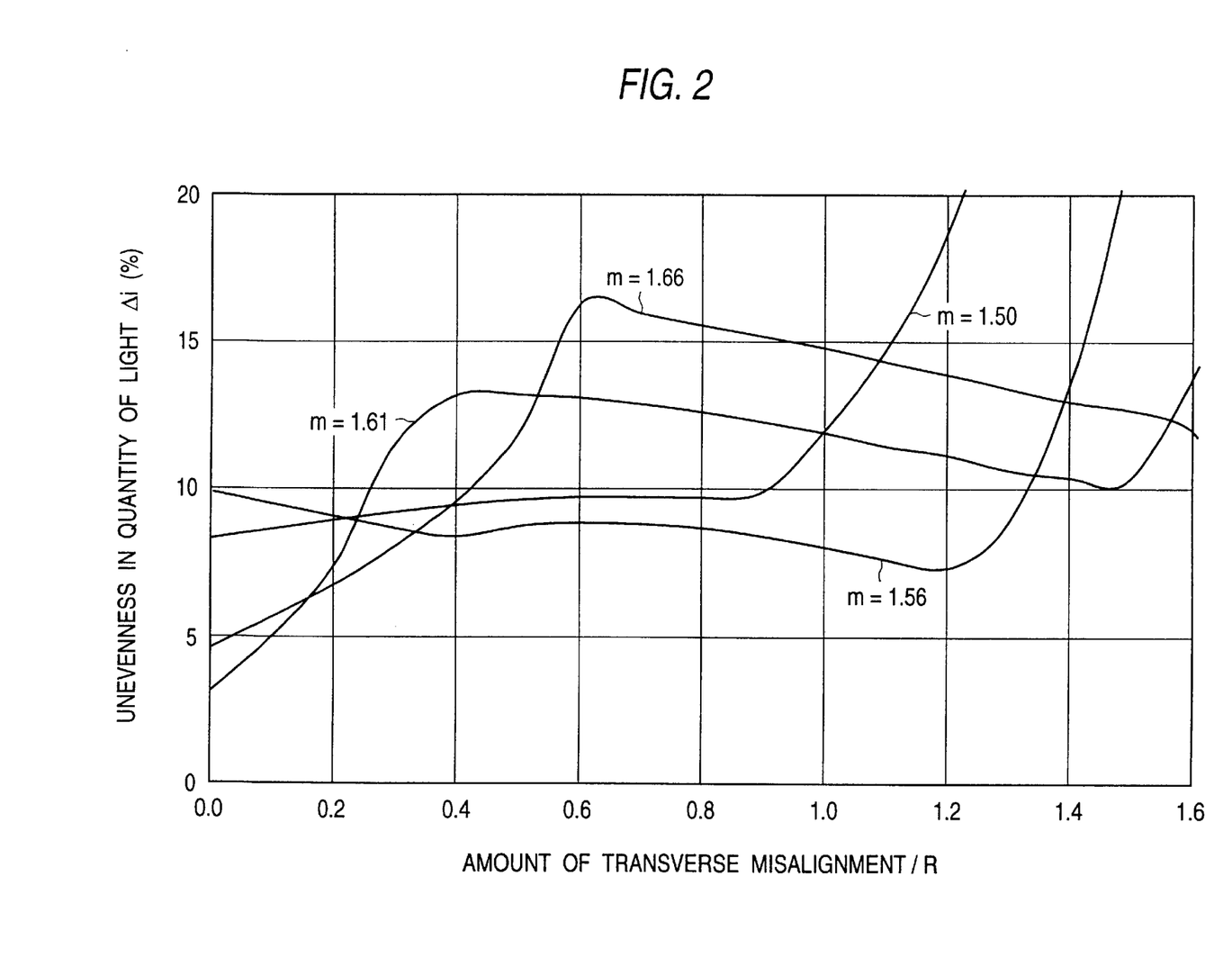
FIG. 2 is a graph showing the relationship between the amount of transverse misalignment and the unevenness in the quantity of light.
Figure 3:
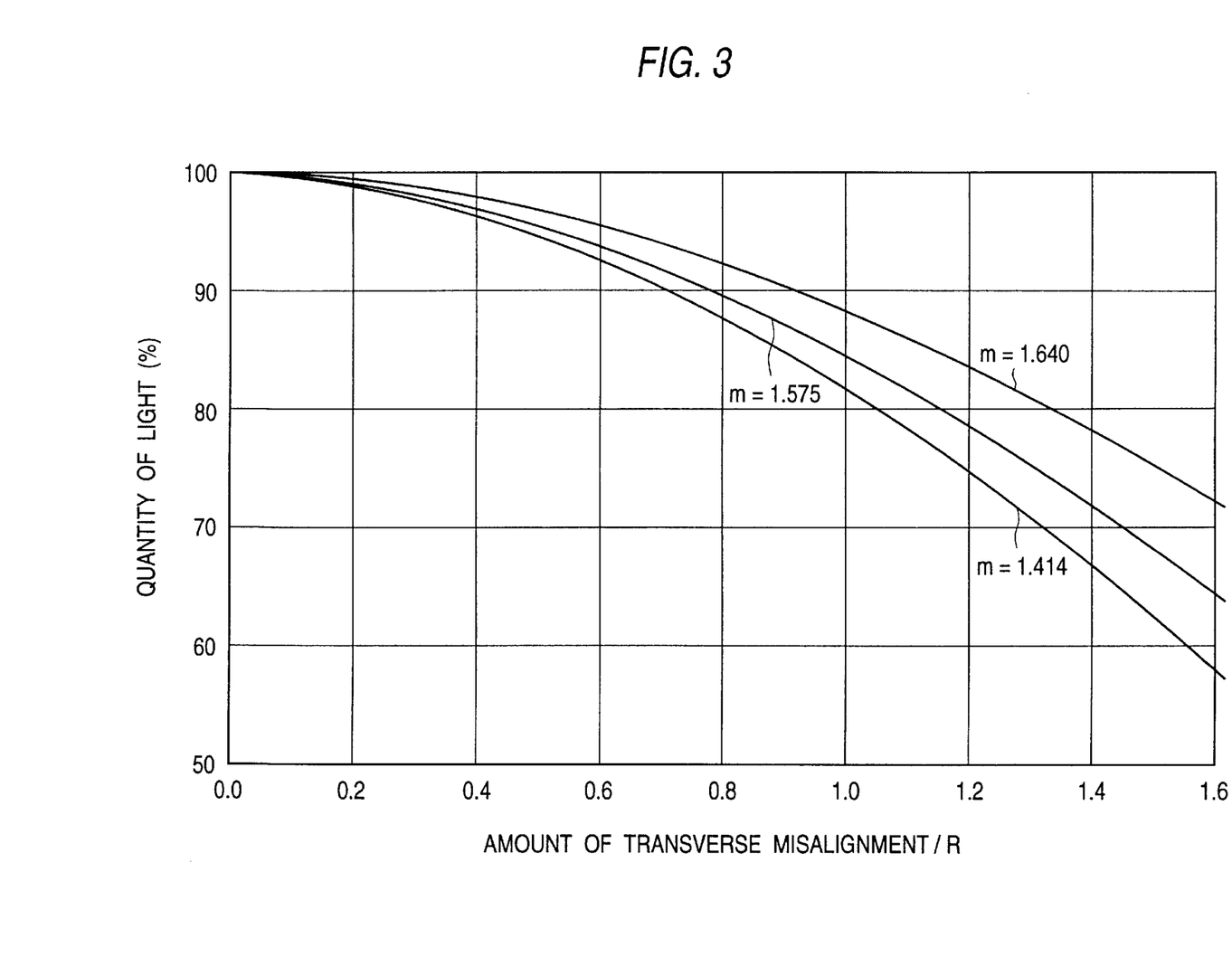
FIG. 3 is a graph showing the relationship between the amount of transverse misalignment and the average quantity of light.

Using this equation, the unevenness in the quantity of light $\Delta i$ and the average quantity of light (taken as 100 on the optical axis) were plotted in FIGS. 2 and 3, respectively, against the amount of transverse misalignment/R for varying values of the degree of overlap m (=1.50, 1.56, 1.61 and 1.66 in FIG. 2 and 1.1414, 1.575 and 1.640 in FIG. 3).

As FIG. 2 shows, the unevenness in the quantity of light on the axis is minimal when m=1.61 but, once a transverse misalignment occurs, the unevenness in the quantity of light increases markedly. In the case of m=1.56, the on-axis unevenness in the quantity of light is comparatively great but, on the other hand, the unevenness in the quantity of light remains at low levels even if the transverse misalignment increases; it is therefore clear that the unevenness in the quantity of light is insensitive to the transverse misalignment if m=1.56. It can also be seen from FIG. 3 that the average quantity of light drops to a level below 90 if the value of transverse misalignment/R exceeds 1.0.

Figure 4:
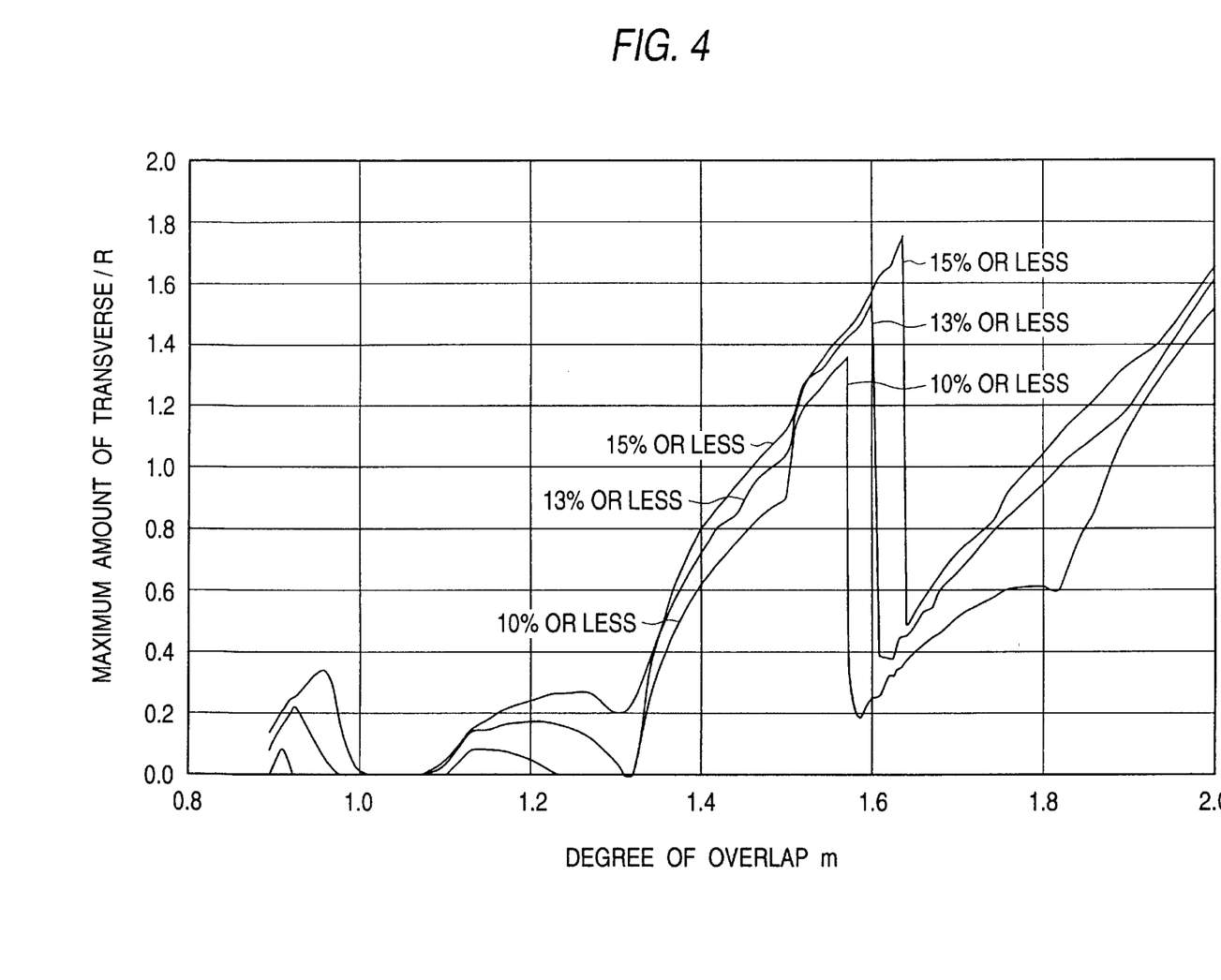
FIG. 4 is a graph showing the relationship between the degree of overlap m and the maximal amount of transverse misalignment for three different cases where the unevenness in the quantity of light is not more 10%, 13% and 15%.

The unevenness in the quantity of light that is tolerated by the scanning apparatus is preferably 15% or less, more preferably 10% or less, at the design stage. A maximal amount of transverse misalignment is plotted in FIG. 4 against the degree of overlap m for three different cases where the unevenness in the quantity of light Δi is not more than 15%, 13% and 10%. In the state of the art, the transverse misalignment that occurs in the assembling process is on the order of 0.2 mm. To allow for this amount of transverse misalignment, a rod lens of R=0.2 mm must be designed to tolerate a transverse misalignment of at least 1.0R. If R is to be further reduced, it goes without saying that the precision in assembling has to be further improved while securing the tolerable range of the transverse misalignment. In addition, the decrease in the quantity of light that occurs from transverse misalignment is desirably kept no more than 10%. To this end, the amount of transverse misalignment must be held below 1.0R as shown in FIG. 3.

If the degree of overlap m is greater than 1.8, the maximum amount of transverse misalignment will increase but, on the other hand, the brightness of the image will decrease unfavorably. A rod lens array in which the degree of overlap m is below 1.3 will produce a bright image but, on the other hand, it is not practical since it can tolerate an extremely small range of transverse misalignment. With the actual rod lens array, the unevenness in the quantity of light is often greater than the calculated value due to the variations in the performance and arrangement of individual lenses. Hence, a sufficient margin should be allowed as early as in the design stage and in view of FIG. 4, the degree of overlap m should be assigned to lie between 1.46 (inclusive) and 1.64 (inclusive), or in the range where the unevenness in the quantity of light is not more than 15% and the maximal amount of transverse misalignment is at least 1.0R or more; a preferred range is $1.48 \leq m \leq 1.60$ where the unevenness in the quantity of light is not more than 13%, and a more preferred range is $1.50 \leq m \leq 1.57$ where the unevenness in the quantity of light is not more 10%.

According to its second aspect, the present invention also provides a life-size imaging optical apparatus which uses a life-size imaging rod lens array in which a plurality of rod lenses each having a refractive-index distribution in the radial direction are arranged in two rows such that the optical axis for one row is parallel to that for the other row, with the surface of a document and a sensor being positioned on opposite sides of said lens array, said lens array satisfying the following conditions:

(1) the outside diameter of each rod lens is such that 0.05 mm $\leq R \leq$ 0.25 mm and $0.5R \leq r_0 \leq 1.0R$ where 2R: the distance between the optical axes of adjacent rod lenses;

$r_0$: the radius of the effective area of each rod lens that provides a lens action;

(2) when the refractive-index distribution of each rod lens is approximated by $n(r)^2 = n_0^2 \cdot \{1-(g \cdot r)^2\}$, $0.05 \leq n_0 \cdot g \cdot r_0 \leq 0.50$ and $1.40 \leq n_0 \leq 1.75$ where r: the distance from the optical axis;

n(r): the refractive index at distance r from the optical axis;

$n_0$: the refractive index on the optical axis;

g: the coefficient of the refractive-index distribution;

(3) the length of each rod lens $Z_0$ is such that $0.5 < Z_0/P < 1.0$ where P: the periodic length of each rod lens as defined by $P = 2\pi/g$;

(4) the degree of apparent overlap m' defined by m'=X'/2R is such that $1.46 \leq m' \leq 1.64$ where X': the view radius of a single rod lens which is given by $X' = L \cdot n_0 \cdot g \cdot r_0 / \sin(Z_0 \pi/P)$; and (5) the distance L between the surface of a document and an end face of each proximal rod lens and the distance L between the sensor and an end face of each proximal rod lens, each distance being calculated as that of an air layer, are each such that $0.8L_0 \leq L < L_0$ or $L_0 < L \leq 1.2L_0$ where $L_0$: the lens working distance given by $L_0 = -(1/n_0 g) \cdot \tan(Z_0 \pi/P)$.

Figure 5:
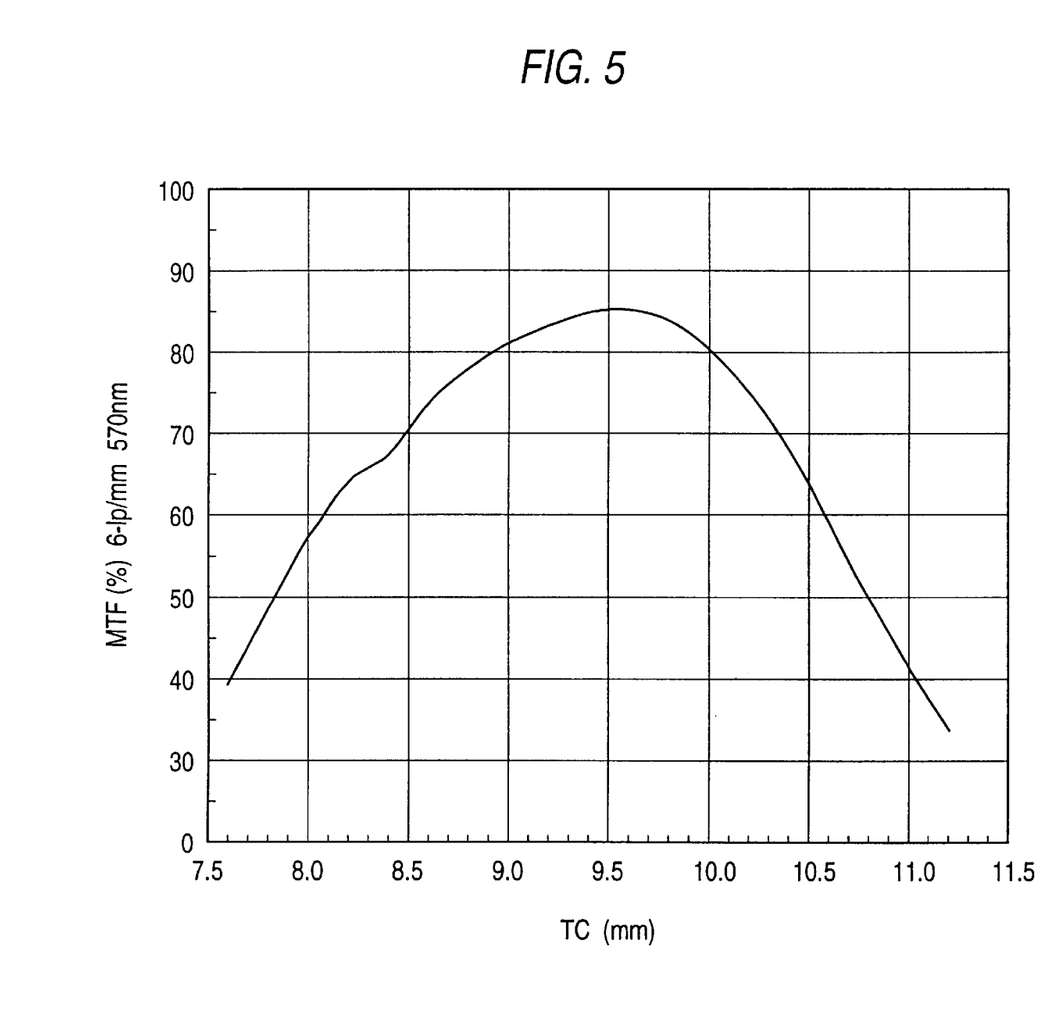
FIG. 5 is a graph showing the relationship between the offset in TC and the MTF value.

One of the characteristic features of the rod lens array is that even if the distance L between the surface of a document and an end face of each proximal rod lens and the distance L between the sensor and an end face of each proximal rod lens, each distance being calculated as that of an air layer, are offset slightly from the lens working distance $L_0$ (i.e., to form a slightly defocused image), its resolving power will not deteriorate very much. Take, for example, a two-row rod lens array having the following specifications: $n_0 = 1.59$; $g = 0.945$ mm$^{-1}$; $R = 0.2$ mm; $r_0 = 0.141$ mm; $Z = 3.81$ mm; and $L_0 = 2.845$ mm. The actual measurements of MTF (modulation transfer function) values (6-1 p/mm; $\lambda = 570$ nm) for a specified range of conjugate distance (TC, or the distance between the object and the image plane) are plotted in FIG. 5. Obviously, at least 60% MTF can be secured even if TC deviated from the optimal 9.5 mm by ±1.1 mm. This is equivalent to a change of ±0.55 mm in L and a value of ±19.3% with reference to $L_0$. In general terms, if L is between $0.8L_0$ (inclusive) and $1.2L_0$ (inclusive), the MTF value will not drop significantly but the unevenness in the quantity of light can be adjusted by varying the apparent degree of overlap m' through the adjustment of L. Hence, the range where the unevenness in the quantity of light is not more than 15% and the maximal amount of transverse misalignment is not more than 1.0R can also be set in terms of the apparent degree of overlap m'=X'/2R which is referenced to the apparent view radius, $X' = L \cdot n_0 \cdot g \cdot r_0 / \sin(Z_0 \pi/P)$, for the case where the distance between the surface of a document and an end face of each proximal rod lens and the distance between the sensor and an end face of each proximal rod lens, each distance being calculated as that of an air layer, are denote by L. The thus set range is $1.46 \leq m' \leq 1.64$. Again, a preferred range is $1.48 \leq m' \leq 1.60$ where the unevenness in the quantity of light is not more than 13% and a more preferred range is $1.50 \leq m' \leq 1.57$ where the unevenness in the quantity of light is not more than 10%.

The refractive index distribution of a rod lens is strictly expressed by the following equation:

$$n(r)^2 = n_0^2 \{1 - (g \cdot r)^2 + h_4 \cdot (g \cdot r)^4 + h_6 \cdot (g \cdot r)^6 + \ldots \}$$

where $h_4$ and $h_6$ are coefficients of index distribution.

The coefficient $h_4$ influences the spherical aberration and the curvature of field and, hence, it has a substantial effect on the resolving power of the lens. In order to produce a satisfactory image, $h_4$ is preferably between −0.5 (inclusive) and 1.5 (inclusive).

If the life-size imaging optical apparatus according to the second aspect of the invention is to be used to read documents, it is usually equipped with a cover glass. To accommodate this situation, a transparent substrate of which the observe surface provides the surface of a document is disposed in such a way that the surface of a document coincides with the front focal position of the lens array. The transparent substrate may be made of glass or plastics. In the case under consideration, an end face of the lens array is preferably placed in contact with the reverse surface of the transparent substrate. In this case, the transparent substrate serves not only as a protector of the individual rod lenses but also to keep a constant distance between the surface of a document and an end face of each proximal rod lens. Needless to say, if the transparent substrate is to be used, the distance L between the surface of a document and an end face of each proximal rod lens, as well as the distance L between the sensor and an end face of each proximal rod lens, each distance being calculated as that of an air layer, have to be adjusted in accordance with the thickness of the transparent substrate and its refractive index. If the optical thickness of the transparent substrate is made equal to the distance L, one only need bring the lens surface of the rod lens array into contact with the reverse surface of the transparent substrate, whereupon the front focal distance of the lens array can always be rendered to coincide with the surface of the document (i.e., the obverse surface of the transparent substrate) without making any positional adjustment. As a result, the positioning of the front focal point of the lens array is obviated and the overall manufacturing process can be simplified.

Preferred Embodiment of the present invention

Figure 6:
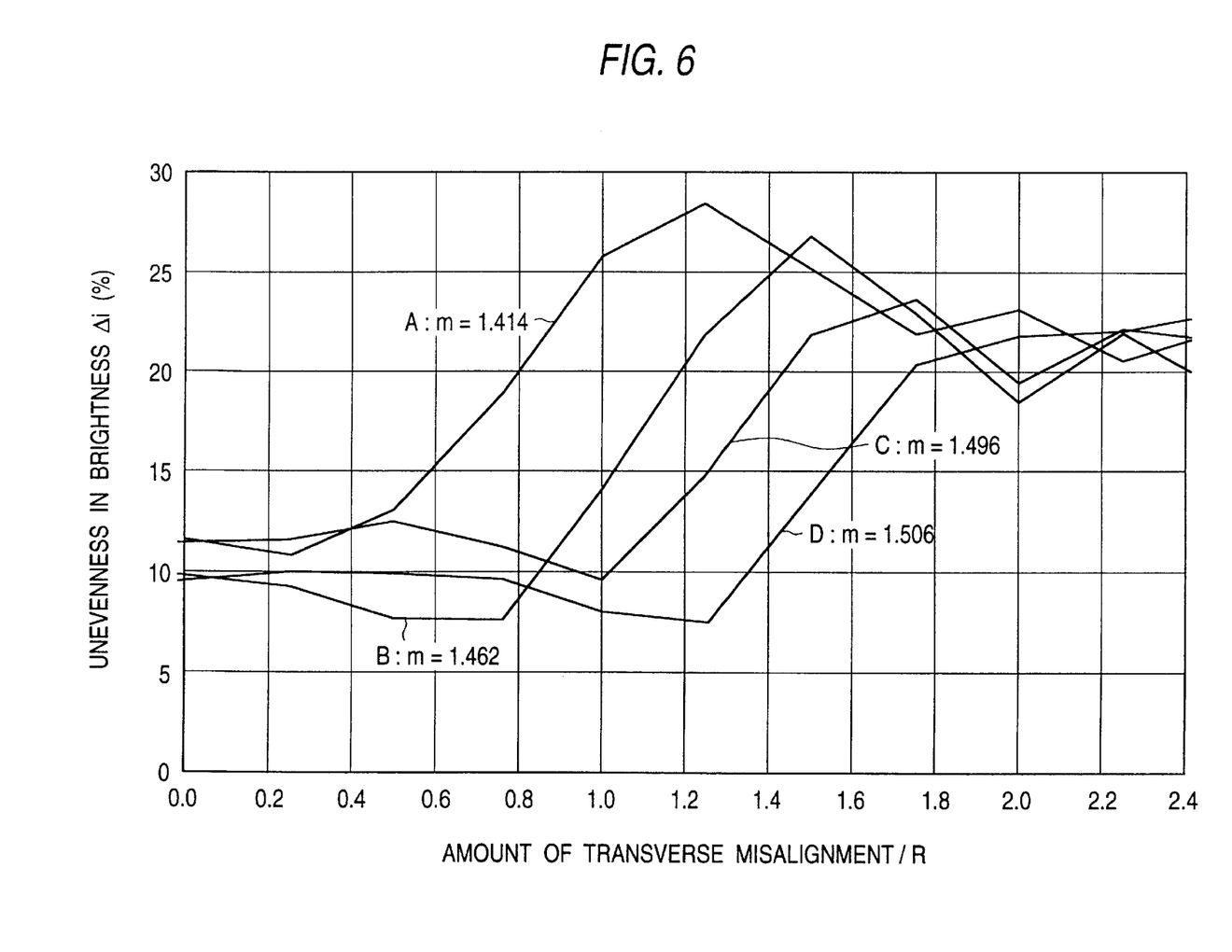
FIG. 6 is a graph for the data of an actual measurement which shows the relationship between the amount of transverse misalignment/R and the unevenness in the quantity of light.
Figure 7:
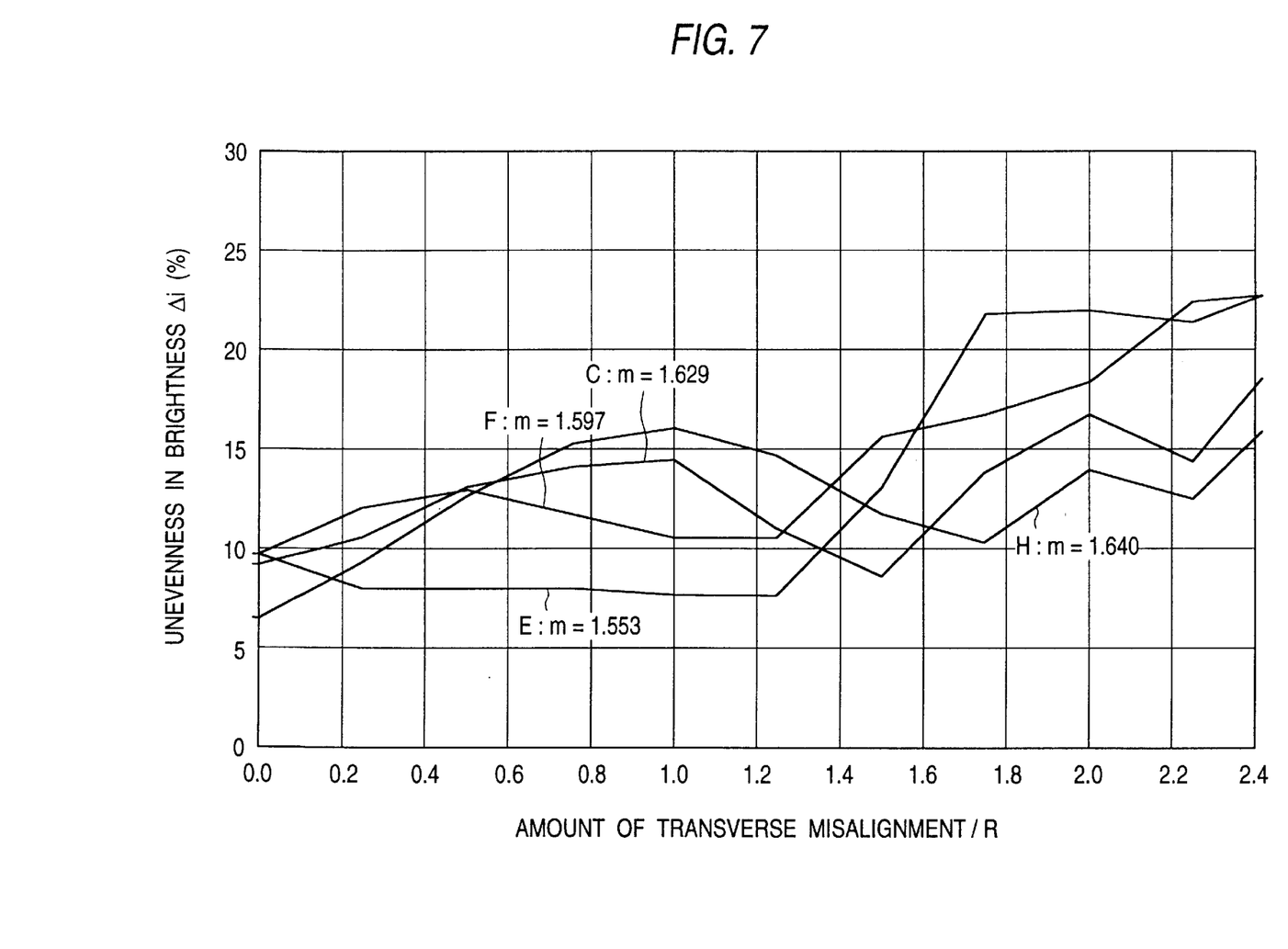
FIG. 7 is a graph for the data of another actual measurement which shows the relationship between the amount of transverse misalignment/R and the unevenness in the quantity of light.

The unevenness in the quantity of light versus transverse misalignment was measured on various samples of a rod lens array in which a plurality of glass rod lenses were arranged in two rows. Each rod lens had an outside diameter of 0.4 mm and its marginal portions were pigmented in black in order to block marginal rays of light that would not contribute to effective formation of a focused image. Hence, the effective lens radius $r_0$ was about 0.14 mm. The optical parameters of each rod lens array sample and their numerical values are shown in Table 1. An experimental setup for measuring the unevenness in the quantity of light was constructed by holding a uniform diffuser plate and a linear CCD array (device distance: 7 $\mu$m) on opposite sides of the rod lens array; the diffuser plate was positioned in registry with the surface of a document and the CCD array in sensor position. The percentage of unevenness in the quantity of light was determined from the output intensity data for 512 CCDs (chip width: ca. 3.6 mm). The results of measurements are shown in FIGS. 6 and 7. The MTF values (6-1 p/mm; $\lambda$=570 nm) in FIG. 1 were also measured with the CCD sensor. Runs A and H were comparative samples and Runs B to G were within the scope of the present invention.

TABLE 1

| Run | A | B | C | D | E | F | G | H |
|---|---|---|---|---|---|---|---|---|
| $n_0$ | 1.5887 | 1.5887 | 1.5887 | 1.5887 | 1.5887 | 1.5887 | 1.5887 | 1.5887 |
| $r_0$(mm) | 0.141 | 0.140 | 0.140 | 0.141 | 0.142 | 0.143 | 0.143 | 0.143 |
| $g$(mm$^{-1}$) | 0.9644 | 0.9490 | 0.9510 | 0.9490 | 0.9532 | 0.9434 | 0.9409 | 0.9400 |
| $n_0 \cdot g \cdot r_0$ | 0.2160 | 0.2111 | 0.2115 | 0.2126 | 0.2150 | 0.2143 | 0.2138 | 0.2136 |
| P(mm) | 6.515 | 6.621 | 6.607 | 6.621 | 6.592 | 6.660 | 6.678 | 6.684 |
| $Z_0$(mm) | 3.780 | 3.820 | 3.800 | 3.810 | 3.780 | 3.810 | 3.810 | 3.810 |
| $z_0/P$ | 0.580 | 0.577 | 0.575 | 0.575 | 0.573 | 0.572 | 0.571 | 0.570 |
| 2R(mm) | 0.400 | 0.400 | 0.400 | 0.400 | 0.400 | 0.400 | 0.400 | 0.400 |
| $r_0/R$ | 0.705 | 0.700 | 0.700 | 0.707 | 0.710 | 0.717 | 0.716 | 0.716 |
| $L_0$(mm) | 2.535 | 2.690 | 2.750 | 2.745 | 2.810 | 2.895 | 2.970 | 2.995 |
| $X_0$(mm) | 0.5656 | 0.5848 | 0.5986 | 0.6022 | 0.6211 | 0.6388 | 0.6516 | 0.6560 |
| L(mm) | $L_0$ | $L_0$ | $L_0$ | $L_0$ | $L_0$ | $L_0$ | $L_0$ | $L_0$ |
| Degree of overlap m = $X_0$/2R | 1.414 | 1.462 | 1.496 | 1.506 | 1.553 | 1.597 | 1.629 | 1.640 |
| MTF(%) | 87.05 | 86.34 | 83.57 | 84.08 | 84.43 | 79.71 | 84.67 | 84.82 |

Figure 8:
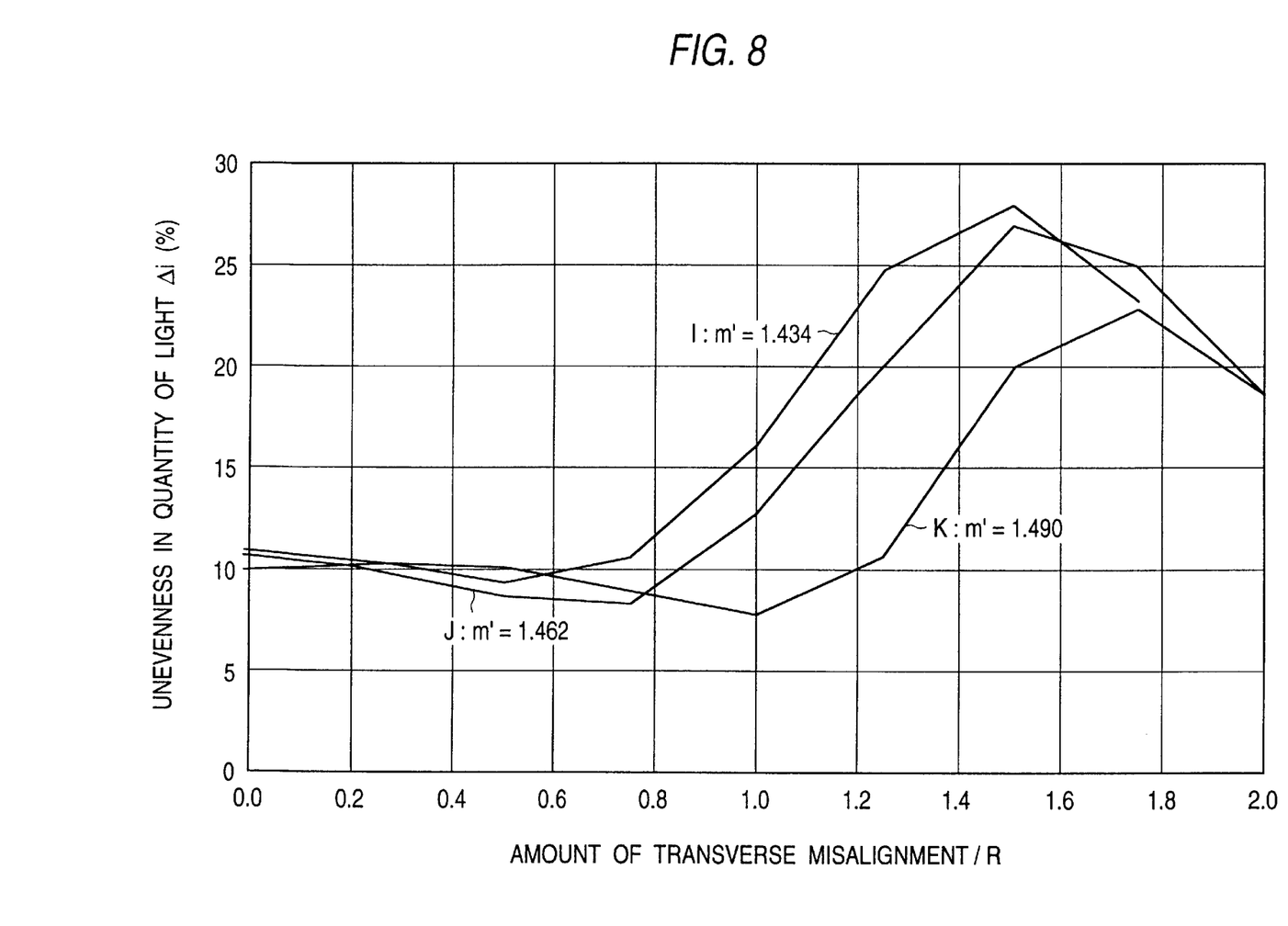
FIG. 8 is a graph for the data of yet another actual measurement which shows the relationship between the amount of transverse misalignment/R and the unevenness in the quantity of light.
Figure 9:
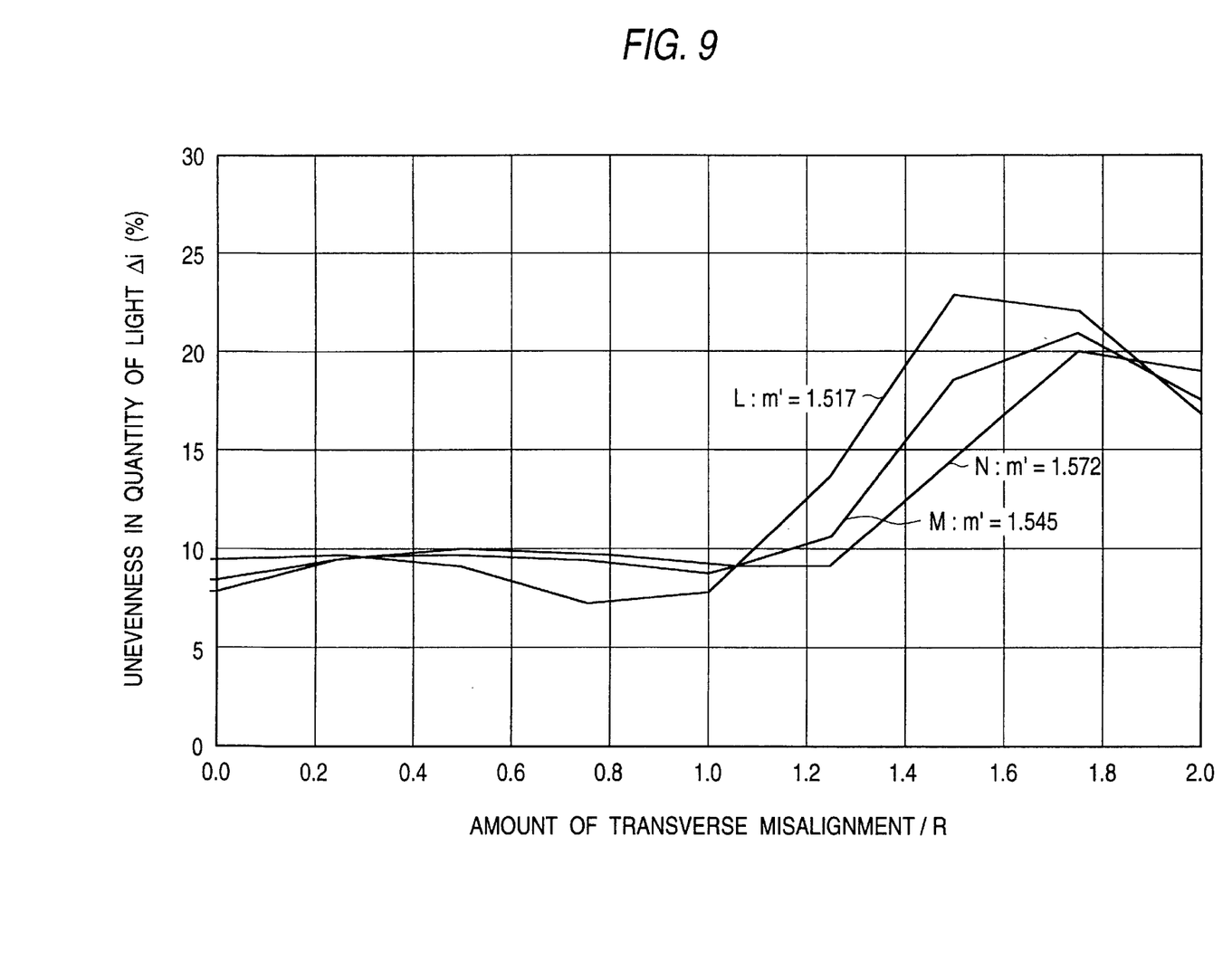
FIG. 9 is a graph for the data of still another actual measurement which shows the relationship between the amount of transverse misalignment/R and the unevenness in the quantity of light.
Figure 10:
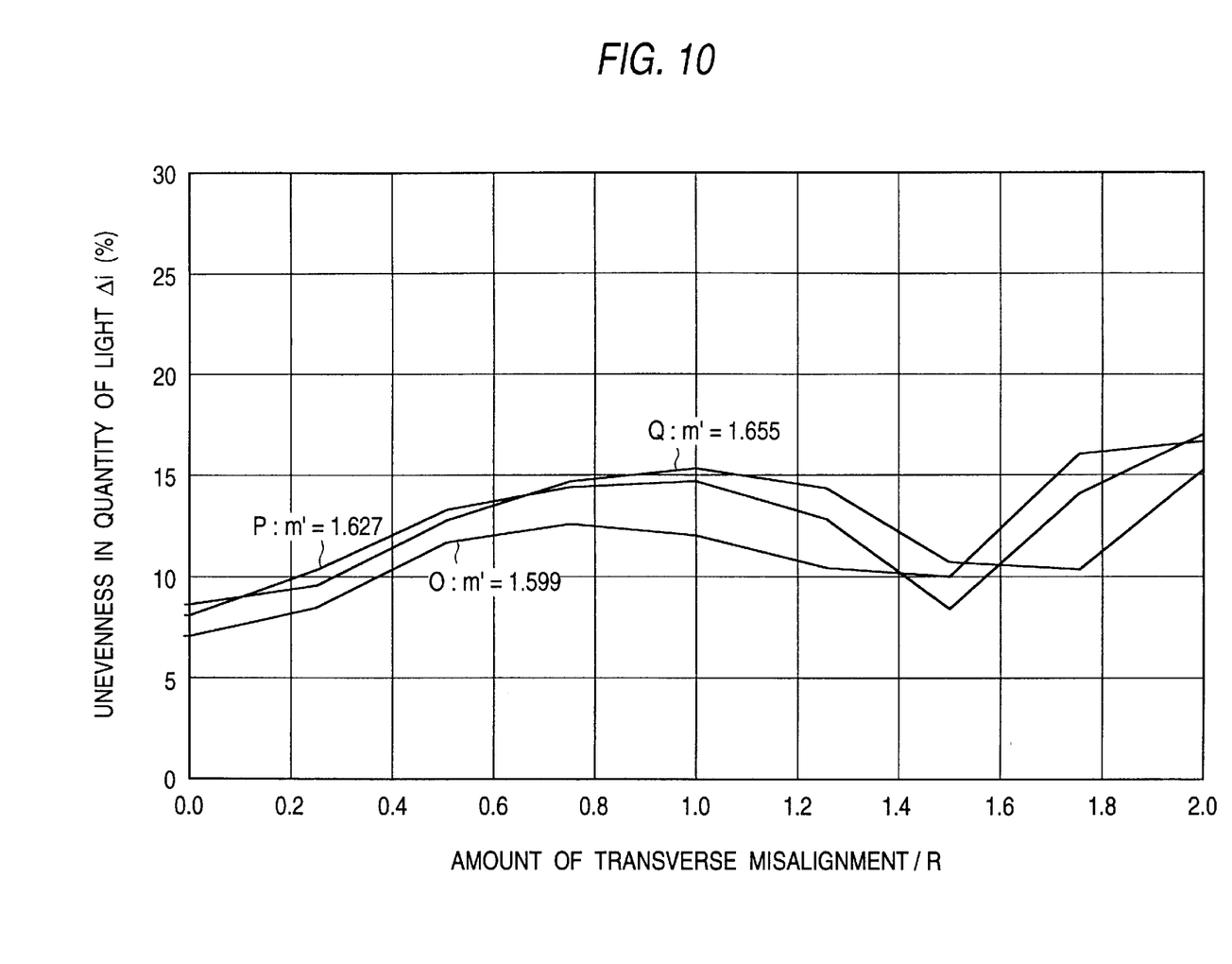
FIG. 10 is a graph for the data of yet another actual measurement which shows the relationship between the amount of transverse misalignment/R and the unevenness in the quantity of light.

An Additional sample of rod lens array was fabricated by arranging a plurality of glass rod lenses in two rows and the unevenness in the quantity of light was measured on this sample, varying only the value of L, i.e., the distance between the surface of a document and an end face of each proximal rod lens and the distance between the sensor and an end face of each proximal rod lens, each distance being calculated as that of an air layer. The sensor for the measurement was of the same type as employed to obtain the data shown in Table 1. The conditions of the measurement are shown in Table 2. The results of the measurement are shown in FIGS. 8, 9 and 10. Runs I and Q in Table 2 were comparative runs and Runs J to P were within the scope of the present invention.

TABLE 2

| Run | I | J | K | L | M | N | O | P | Q |
|---|---|---|---|---|---|---|---|---|---|
| $n_0$ | 1.5900 | 1.5900 | 1.5900 | 1.5900 | 1.5900 | 1.5900 | 1.5900 | 1.5900 | 1.5900 |
| $r_0$(mm) | 0.142 | 0.142 | 0.142 | 0.142 | 0.142 | 0.142 | 0.142 | 0.142 | 0.142 |
| $g$(mm$^{-1}$) | 0.9508 | 0.9508 | 0.9508 | 0.9508 | 0.9508 | 0.9508 | 0.9508 | 0.9508 | 0.9508 |
| $n_0 \cdot g \cdot r_0$ | 0.2147 | 0.2147 | 0.2147 | 0.2147 | 0.2147 | 0.2147 | 0.2147 | 0.2147 | 0.2147 |
| P(mm) | 6.608 | 6.608 | 6.608 | 6.608 | 6.608 | 6.608 | 6.608 | 6.608 | 6.608 |
| $Z_0$(mm) | 3.810 | 3.810 | 3.810 | 3.810 | 3.810 | 3.810 | 3.810 | 3.810 | 3.B10 |

TABLE 2-continued

| Run | I | J | K | L | M | N | O | P | Q |
|---|---|---|---|---|---|---|---|---|---|
| $Z_0/P$ | 0.577 | 0.577 | 0.577 | 0.577 | 0.577 | 0.577 | 0.577 | 0.577 | 0.577 |
| 2R(mm) | 0.400 | 0.400 | 0.400 | 0.400 | 0.400 | 0.400 | 0.400 | 0.400 | 0.400 |
| $r_0/R$ | 0.710 | 0.710 | 0.710 | 0.710 | 0.710 | 0.710 | 0.710 | 0.710 | 0.710 |
| $L_0$(mm) | 2.695 | 2.695 | 2.695 | 2.695 | 2.695 | 2.695 | 2.695 | 2.695 | 2.695 |
| $X_0$(mm) | 0.5960 | 0.5960 | 0.5960 | 0.5960 | 0.5960 | 0.5960 | 0.5960 | 0.5960 | 0.5960 |
| L(mm) | 2.595 | 2.645 | 2.695 | 2.745 | 2.795 | 2.845 | 2.895 | 2.945 | 2.995 |
| $L/L_0$ | 0.962 | 0.991 | 1.000 | 1.018 | 1.037 | 1.055 | 1.074 | 1.092 | 1.111 |
| X'(mm) | 2.5736 | 0.5847 | 0.5960 | 0.6068 | 0.6178 | 0.6289 | 0.6397 | 0.6510 | 0.6620 |
| Degree of apparent overlap m' = X'/2R | 1.434 | 1.462 | 1.490 | 1.517 | 1.545 | 1.572 | 1.599 | 1.627 | 1.655 |
| MTF(%) | 81.49 | 82.43 | 83.36 | 82.82 | 82.26 | 80.53 | 79.62 | 78.74 | 75.80 |

Thus, according to the present invention, certain parameters of a rod lens array are specified in such a way that even if a transverse misalignment occurs between the sensor and the overall axis of the lens array due to the dimensional errors in parts and the assembling errors which accompany the adoption of smaller-diameter rod lenses, the unevenness in the quantity of light can be minimized to contribute to the realization of a compact life-size imaging optical apparatus and to greater ease in its manufacture.

Figure 11:
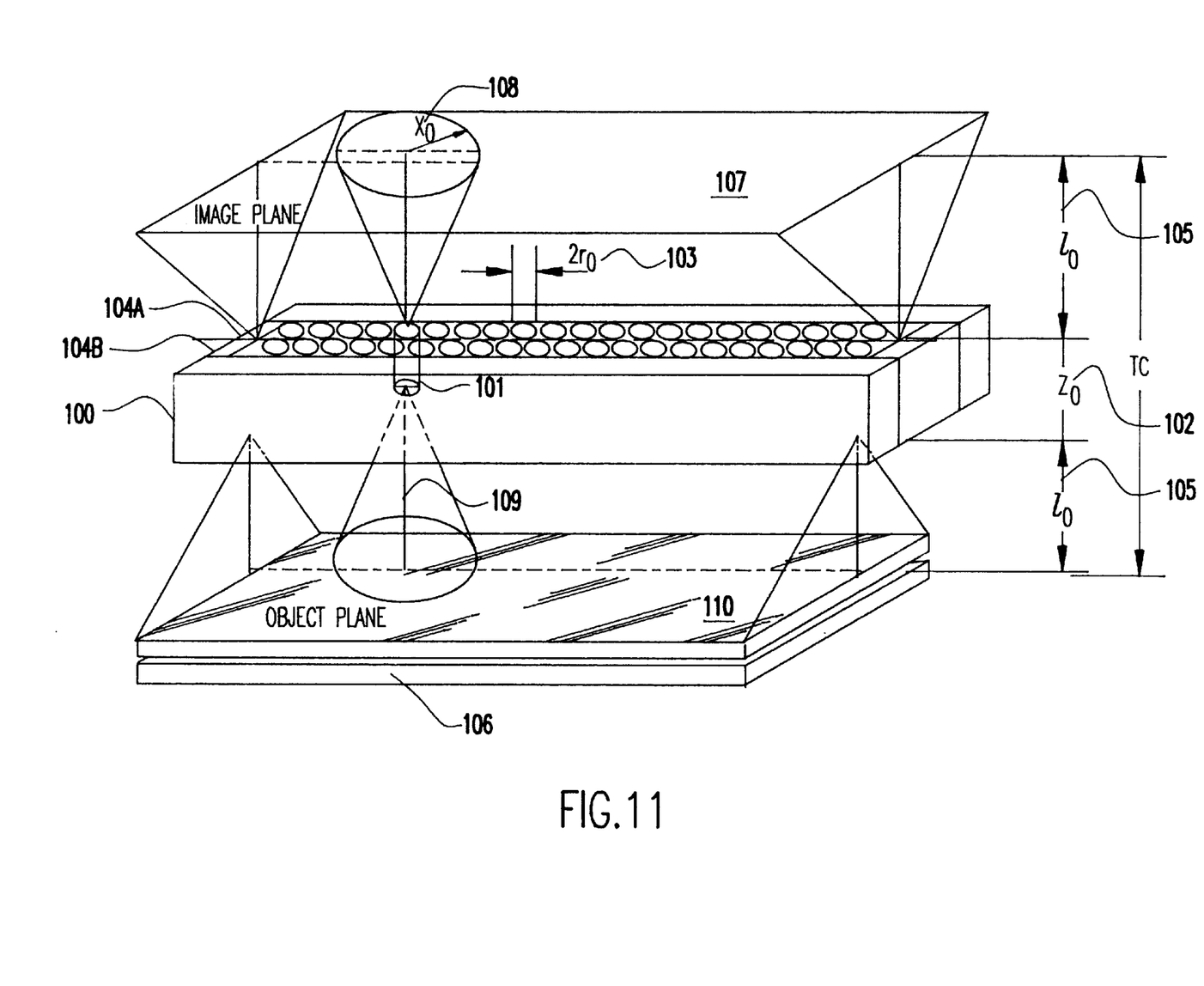
FIG. 11 is a schematic drawing, partially in cross-section, of a gradient-index rod lens array with two rows.

FIG. 11 shows a possible implementation of a gradient-index rod lens array according too the above described example of the present invention. A housing 100 is shown in partial cross-section to allow a rod 101 to be shown. The rods have a length $Z_0$ 102 and a diameter $2r_0$ 103. The device shown has two rows of rods 104a and 104b such the optical axes of each rod 109 are parallel. The end face of a proximal rod lens 101 is located at a distance $l_0$ 105 from a surface document 106. The image plane 107 is also located a distance $l_0$ 105 from the second end face of a proximal rod lens 101. The view radius $X_0$ 108 of a single rod lens 101 is shown on the image plane 107. A transparent substrate 110 is shown with is obverse surface providing a surface for a document 106.

What is claimed is:

1. A life-size imaging rod lens array comprising:

a plurality of rod lenses each having a refractive-index distribution in the radial direction are arranged in two rows such that the optical axis for one row is parallel to that for the other row, said rod lens array satisfying the following conditions:

(1) the outside diameter of each rod lens is such that 0.05 mm$\leq$R$\leq$0.25 mm and 0.5R$\leq r_0 \leq$1.0R where 2R: the distance between the optical axes of adjacent rod lenses;

$r_0$: the radius of the effective area of each rod lens that provides a lens action;

(2) when the refractive-index distribution of each rod lens is approximated by $n(r)^2 = n_0^2 \cdot \{1-(g \cdot r)^2\}$, 0.05$\leq n_0 \cdot g \cdot r_0 \leq$0.50 and 1.40$\leq n_0 \leq$1.75 where r: the distance from the optical axis;

n(r): the refractive index at distance r from the optical axis;

$n_0$: the refractive index at the optical axis;

g: the coefficient of the refractive-index distribution;

(3) the length of each rod lens $Z_0$ is such that 0.5<$Z_0/P$<1.0 where P: the periodic length of each rod lens as defined by P=$2\pi/g$; and (4) the degree of overlap m defined by m=$X_0/2R$ is such that 1.46$\leq$m$\leq$1.64 where $X_0$: the view radius of a single rod lens which is given by $X_0 = -r_0/\cos(Z_0\pi/P)$.

2. A life-size imaging optical apparatus comprising:

a life-size imaging rod lens array in which a plurality of rod lenses each having a refractive-index distribution in the radial direction are arranged in two rows such that the optical axis for one row is parallel to that for the other row, with the surface of a document and a sensor being positioned on opposite sides of said lens array, said rod lens array satisfying the following conditions:

(1) the outside diameter of each rod lens is such that 0.05 mm$\leq$R$\leq$0.25 mm and 0.5R$\leq r_0 \leq$1.0R where 2R: the distance between the optical axes of adjacent rod lenses;

$r_0$: the radius of the effective area of each rod lens that provides a lens action;

(2) when the refractive-index distribution of each rod lens is approximated by $n(r)^2 = n_0^2 \cdot \{1-(g \cdot r)^2\}$, 0.05$\leq n_0 \cdot g \cdot r_0 \leq$0.50 and 1.40$\leq n_0 \leq$1.75 where r: the distance from the optical axis;

n(r): the refractive index at distance r from the optical axis;

$n_0$: the refractive index at the optical axis;

g: the coefficient of the refractive-index distribution;

(3) the length of each rod lens $Z_0$ is such that 0.5<$Z_0/P$<1.0 where P: the periodic length of each rod lens as defined by P=$2\pi/g$; and (4) the degree of overlap m defined by m=$X_0/2R$ is such that 1.46$\leq$m$\leq$1.64 where $X_0$: the view radius of a single rod lens which is given by $X_0 = -r_0/\cos(Z_0\pi/P)$ wherein, the distance L between the surface of a document and an end face of each proximal rod lens and the distance L between the sensor and an end face of each proximal rod lens, each distance being calculated as that of an air layer, both satisfy the following condition:

L=$L_0$ where $L_0$: the lens working distance given by $L_0 = -(1/n_0 g)\tan(Z_0\pi/P)$.

3. The life-size imaging optical apparatus according to claim 2, wherein a transparent substrate of which the obverse surface provides the surface of a document is disposed in such a way that the surface of a document coincides with the front focal position of the lens array.

4. The life-size imaging optical apparatus according to claim 3, wherein an end face of the lens array is in contact with the reverse surface of the transparent substrate.

5. A life-size imaging optical apparatus which uses a life-size imaging rod lens array in which a plurality of rod lenses each having a refractive-index distribution in the radial direction are arranged in two rows such that the optical axis for one row is parallel to that for the other row, with the surface of a document and a sensor being positioned on opposite sides of said lens array, said lens array satisfying the following conditions:

(1) the outside diameter of each rod lens is such that 0.05 mm $\leq R \leq$ 0.25 mm and $0.5R \leq r_0 \leq 1.0R$ where 2R: the distance between the optical axes of adjacent rod lenses;

$r_0$: the radius of the effective area of each rod lens that provides a lens-action;

(2) when the refractive-index distribution of each rod lens is approximated by $n(r)^2 = n_0^2\{1-(g \cdot r)^2\}$, $0.05 < n_0 \cdot g \cdot r_0 \leq 0.50$ and $1.40 \leq n_0 \leq 1.75$ where r: the distance from the optical axis;

n(r): the refractive index at distance r from the optical axis;

$n_0$: the refractive index on the optical axis;

g: the coefficient of the refractive-index distribution;

(3) the length of each rod lens $Z_0$ is such that $0.5 < Z_0/P < 1.0$ where P: the periodic length of each rod lens as defined by $P = 2\pi/g$;

(4) the degree of apparent overlap m' defined by m'=X'/2R is such that $1.46 \leq m' \leq 1.64$ where X': the view radius of a single rod lens which is given by $X' = L \cdot n_0 \cdot g \cdot r_0 / \sin(Z_0 \pi/P)$; and (5) the distance L between the surface of a document and an end face of each proximal rod lens and the distance L between the sensor and an end face of each proximal rod lens, each distance being calculated as that of an air layer, are each such that $0.8L_0 \leq L \leq L_0$ or $L_0 \leq L \leq 1.2L_0$ where $L_0$: the lens working distance given by $L_0 = -(1/n_0 g) \cdot \tan(Z_0 \pi/P)$.

6. The life-size imaging optical apparatus according to claim 5, wherein a transparent substrate of which the obverse surface provides the surface of a document is disposed in such a way that the surface of a document coincides with the front focal position of the lens array.

7. The life-size imaging optical apparatus according to claim 6, wherein an end face of the lens array is in contact with the reverse surface of the transparent substrate.

* * * * *